(12) United States Patent
Sato

(10) Patent No.: US 7,714,532 B2
(45) Date of Patent: May 11, 2010

(54) BATTERY CHARGER AND CHARGE CONTROL METHOD

(75) Inventor: Kazumi Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 1192 days.

(21) Appl. No.: 10/878,447

(22) Filed: Jun. 29, 2004

(65) Prior Publication Data

US 2005/0017674 A1 Jan. 27, 2005

(30) Foreign Application Priority Data

Jul. 14, 2003 (JP) ............................ P2003-273949

(51) Int. Cl.
*H02J 7/00* (2006.01)
*H02J 7/04* (2006.01)

(52) U.S. Cl. ....................... 320/106; 320/107; 320/112; 320/113; 320/155; 320/156

(58) Field of Classification Search ................. 320/155, 320/106, 107, 112, 110, 113, 156, 157
See application file for complete search history.

(56) References Cited

U.S. PATENT DOCUMENTS

| 4,577,144 A | * | 3/1986 | Hodgman et al. | ............ 320/106 |
|---|---|---|---|---|
| 5,600,224 A | * | 2/1997 | Mody et al. | ................. 320/106 |
| 5,767,659 A | * | 6/1998 | Farley | ........................ 320/106 |
| 5,998,962 A | * | 12/1999 | Akiya | ........................ 320/106 |
| 6,236,186 B1 | * | 5/2001 | Helton et al. | ................ 320/106 |
| 6,377,020 B1 | * | 4/2002 | Yokoyama | ................... 320/106 |
| 6,504,341 B2 | * | 1/2003 | Brotto | ......................... 320/106 |

FOREIGN PATENT DOCUMENTS

JP 07-065864 3/1995

\* cited by examiner

*Primary Examiner*—Edward Tso
*Assistant Examiner*—Alexis Boateng
(74) *Attorney, Agent, or Firm*—Rader, Fishman & Grauer PLLC

(57) ABSTRACT

Safety against error setting of a primary battery in a dedicated battery charger for secondary batteries can be assured even when the battery charger is of a timer type advantageous for cost reduction. A switching circuit (2) is connected between terminals (13, 15), and terminals (14, 16) are connected. Terminals (15, 17) are connected, and terminals (16, 18) are connected. The positive pole of a battery (3) set in position is connected to the terminal (17), and the negative pole is connected to the terminal (18). A battery discriminating circuit (4) connects to the positive pole and the negative pole of the battery (3) set in position; and judges whether the battery (3) is a primary battery or a secondary battery. Depending upon the result of the discrimination, the battery discriminating circuit (4) supplies a switching signal to the switching circuit (5) to turn it on or off. A capacitor (6) and a resistor 7 are connected in parallel between a timer circuit (9) and a ground potential. The switching circuit (5) and a resistor (8) are connected in series between the timer circuit (9) and the ground potential. Once the switching circuit (2) turns on, a constant voltage source circuit 1 supplies a charging direct current to the secondary battery.

4 Claims, 5 Drawing Sheets

BATTERY CHARGER AND CHARGE CONTROL METHOD

BACKGROUND OF THE INVENTION

1. Field of the Invention

The present invention relates to a battery charger and a charge control method capable of discriminating whether the battery to be charged and set in the battery charger is a primary battery or a secondary battery.

2. Description of the Related Art

Nonaqueous secondary batteries like nickel hydride secondary batteries and lithium ion secondary batteries can be restored to the pre-discharged state by charging, and their running cost is lower and more economical than primary batteries such as alkaline cells even when a battery charger and the power consumption upon charging are taken into account.

Until recently, versatile primary batteries have been the main current of power sources of portable electronic devices such as digital cameras having been popularized quickly. However, the main stream is moving to secondary batteries that have been improved in capacity and lifetime in addition to their economical advantage.

Furthermore, since secondary batteries are produced in the same shaped and sizes as primary batteries, electronic devices using them as their power sources need not be changed in battery-accommodating structure too accommodate the secondary batteries, and end-users can freely select and use either primary batteries or secondary batteries.

On the other hand, regarding dedicated battery chargers for secondary batteries, it is presumed that end-users set and charge primary batteries of the same shapes and sizes by mistake, and a design for preventing such accidents has come to be needed.

There various reports on methods of discriminating primary batteries from secondary batteries and methods of stopping the charging when primary batteries are set. Until now, it is the main stream to mount a microcomputer in the battery charger to turn the charging switch on and off.

For example, one of them proposes applying a reference voltage from a battery pack 22 to a monitor resistor 2 via a standard-discriminating resistor 224. In the monitor resistor 214, a monitor voltage determined by the standard of the connected battery 221 is generated. The monitor voltage is converted to a digital value by an A/D (Analog to Digital) converter 215 and sent to a CPU (Central Processing Unit) 212 (see, for example, Japanese Patent Laid-open Publication JP-H07-065864).

However, microcomputers are expensive. Therefore, the method using microcomputers involves the problem of increasing the cost of battery chargers.

Additionally, various battery chargers characterized in low costs are commercially available. However, almost all of them are of a timer charging system that completes the charging after a predetermined length of time. Since they are controlled simply by turning the charging switches on or off, the cost can be very low. However, since they do not have the function of interrupting the charging when a primary battery is set by mistake, they involve the problem of disregarding the safety against error setting of a primary battery.

OBJECTS AND SUMMARY OF THE INVENTION

It is therefore an object of the invention to provide a battery charger and a charge control method having of a timer system configuration to reduce the cost of a dedicated battery charger for secondary batteries and capable of ensuring the safety against error setting of a primary battery.

According to the first aspect of the invention, there is provided battery charger for controlling the length of time for charging a secondary battery with a timer circuit, comprising:

discriminating means for discriminating whether a battery set in charging position is a primary battery or a secondary battery;

a time constant means for setting the length of charging time by means of a time constant; and a time constant switching means for switching the time constant, wherein the time constant switching means switches the time constant to shorten the length of charging time when the battery is judged a primary battery.

According to the second aspect of the invention, there is provided a charge control method for controlling the length of time for charging a secondary battery with a timer circuit, comprising:

discriminating whether a battery set in charging position is a primary battery or a secondary battery;

setting the length of charging time by means of a time constant; and switching the time constant to shorten the length of charging time when the battery is judged a primary battery.

As summarized above, the charging device and the charge control method can discriminate whether the battery set in place is a primary battery or a secondary battery and capable of switching to a short charging length of time when the battery set in place is determined a primary battery.

According to the present invention, inexpensive and very safe charging is ensured without using expensive control ICs (Integrated Circuits) such as microcomputers.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be explained below with reference to the drawings. Explanation is first made about the charging of a secondary battery for easier understanding of the present invention. NCd (Ni—Cd) batteries and nickel hydride batteries used for years as secondary batteries are charged by a constant current system for detecting a voltage drop that occurs when the battery is fully charged and/or by a $\Delta T/\Delta t$ system for monitoring the battery temperature. In contrast, lithium ion secondary batteries are charged by a constant current constant voltage control system, and their full charge is detected by the same system as well. As such, there are various charging systems. In this embodiment, however, the control method of voltage and current is omitted, and the charging is controlled only by the charging time.

Figure 1:
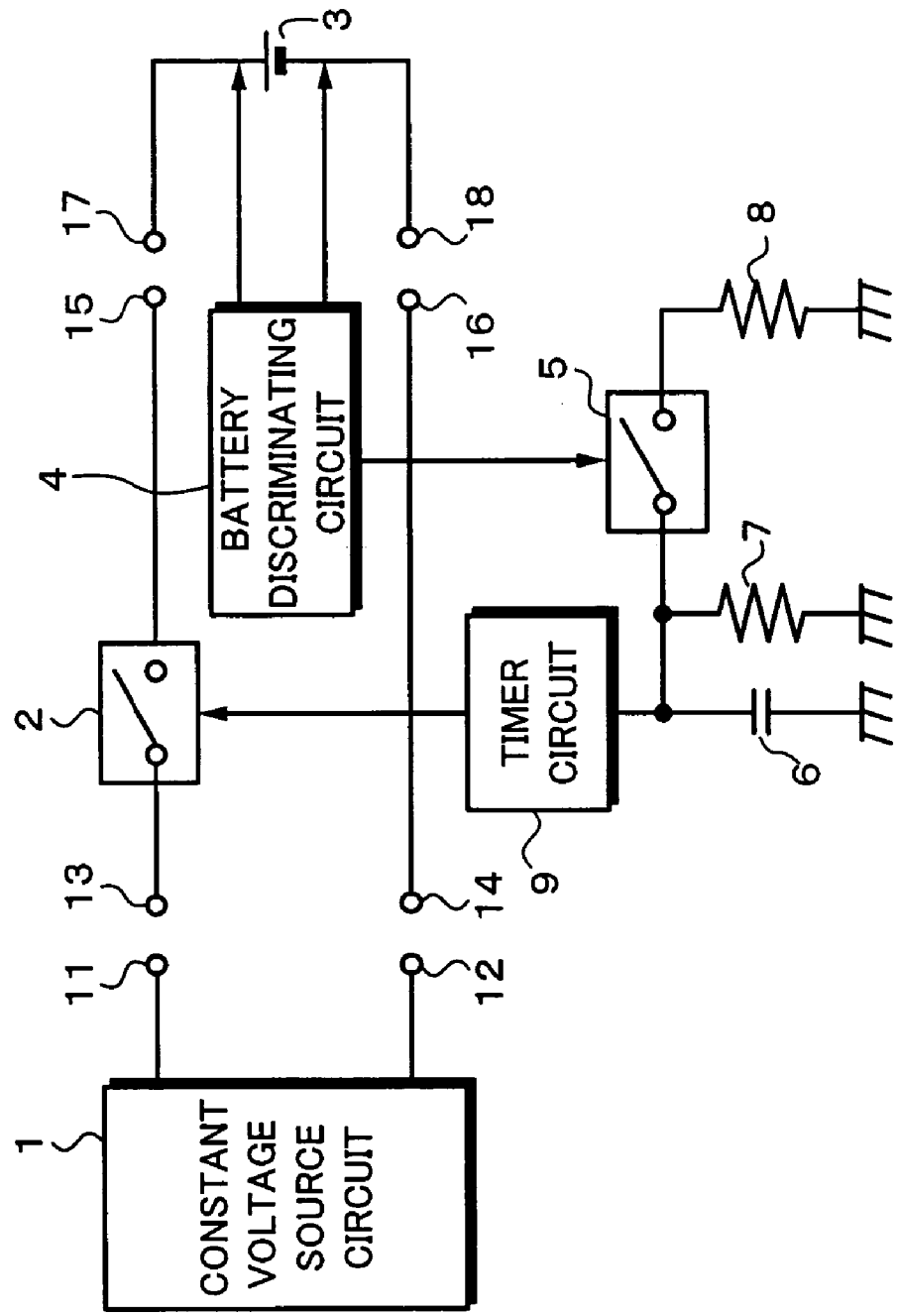
FIG. 1 is a block diagram for explaining an embodiment to which the present invention is applied.

With reference to FIG. 1, an embodiment of the invention is explained. A positive pole terminal 11 is extracted from a constant voltage source circuit 1, and a negative pole terminal 12 is extracted from the constant voltage source circuit 1. The terminal 11 is connected to the terminal 13, and the terminal 12 is connected to a terminal 14. A switch circuit 2 is interposed between the terminal 13 and a terminal 15, and the terminal 14 is connected to a terminal 16. The terminal 15 is connected to a terminal 17, and the terminal 16 is connected to a terminal 18. The positive pole of a battery 3 set in position is connected to the terminal 17, and the negative pole of the battery 3 is connected to the terminal 18.

A battery discriminating circuit 4 connects to the positive pole and the negative pole of the battery 3 set in position and discriminates whether the battery 3 is a primary battery or a secondary battery. Depending upon the result of the discrimination, the battery discriminating circuit 4 supplies the switching circuit 5 with a switching signal for turning the switching circuit 5 on and off. A capacitor 6 and a resistor 7 are interposed in parallel between a timer circuit 9 and the ground potential, and the switching circuit 5 and a resistor are interposed in series between the timer circuit 9 and the ground potential. The condenser 6 and the resistors 7 and 8 form a time constant circuit of the timer circuit 9, and the time constant changes depending upon the ON/OFF state of the switching circuit 5. Therefore, the timing of the switching signal supplied from the timer circuit 9 to the switching circuit 2 is different between the ON state and the OFF state of the switching circuit 5.

When the switching circuit 2 turns on, a charging direct current is supplied from the constant voltage source circuit 1 to the secondary battery. The constant voltage source circuit 1 may be any of an AC (Alternating Current) adapter of a switching power source system configured to output a constant voltage constant current from a commercial power source, DC adapter of a DC (Direct Current)-DC converter system configured to lower the voltage of a car-borne cigar lighter, and so forth, and the voltage/current of the constant voltage source circuit 1 is not limitative.

The battery discriminating circuit 4 discriminates whether the battery 3 set in position is a primary battery or a secondary battery, and supplies the result of the discrimination to the switching circuit 5. The timer circuit 9 supplies a switching signal to the switching circuit 2 to turn the switching circuit 2 off at the elapse of the time determined by the time constant circuit composed of the capacitor 6 and the resistors 7 and 8 after the setting of the battery 3 in position.

Figure 2:
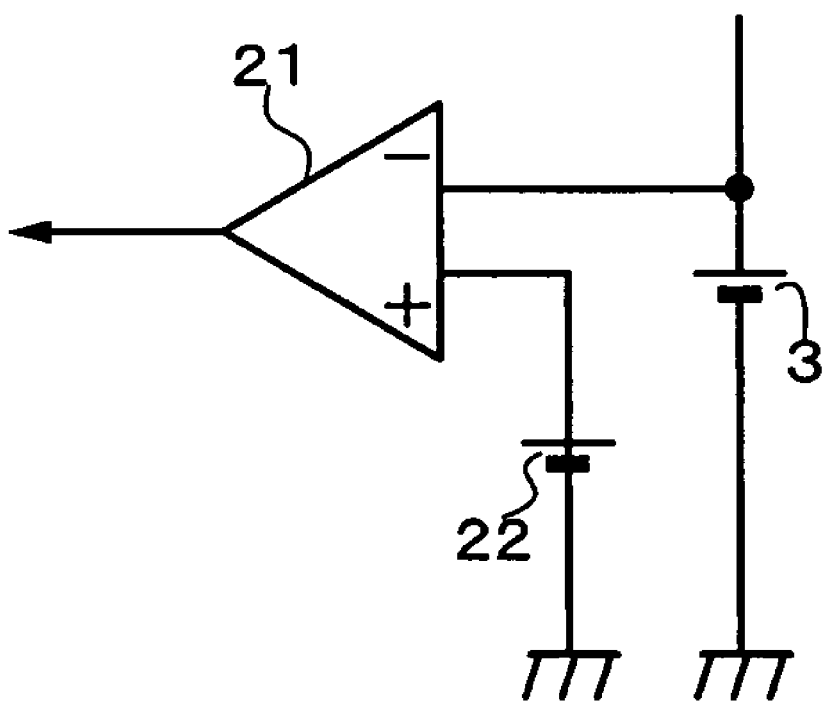
FIG. 2 is a block diagram for explaining a battery discriminating circuit usable in an embodiment of the invention.

With reference to FIG. 2, an example of the battery discriminating circuit 4 is explained. The battery discriminating circuit 4 is composed of a comparator 21 and a reference voltage 22. The inverted input terminal of the comparator 21 is connected to the positive pole of the battery 3, and the non-inverted input terminal is connected to the positive pole of the reference voltage 22. Output of the comparator 21 is supplied to a switching signal to the switching circuit 5. The negative pole of the battery 3 is grounded, and the negative pole of the reference voltage 22 is grounded as well.

In case the voltage of the battery 3 is higher than the reference voltage 22, the battery 3 set in position is determined to be a secondary battery, and a switching signal for turning the switching circuit 5 off is supplied to the switching circuit 5.

Usually, voltages of primary batteries are around 1.5 V, and those of secondary batteries are around 1.2 V. Therefore, the battery set in position can be determined to be a primary battery or a secondary battery from its voltage value by setting the reference voltage 22 to around 1.45 V.

It should be noted that the battery discriminating circuit 4 should remain operative even after the charging is started. If a discharged primary battery is set in position, for example, its initial voltage will be lower than the reference voltage, 1.45 V. Therefore, the battery discriminating circuit 4 may first misidentify the primary battery as a secondary battery, but properly discriminates it as a primary battery later when the charging starts and the charging current flows.

More specifically, primary batteries, either new or discharged, exhibits higher internal resistance values than secondary batteries. Therefore, once a voltage corresponding to the production of the charging current and the internal resistance (charging current×internal resistance) is added to the initial battery voltage, the voltage across the opposite ends of the battery, which is the voltage input to the inverted input terminal of the comparator 21, becomes higher than the reference voltage 22. Thus, the discharged primary battery once identified as a secondary battery is reliably discriminated as a primary battery several minutes later than the start of the charging.

Further, since the battery discriminating circuit 4 is held operative even after the charging starts, the optimum value of the reference voltage 22 is approximately 1.45 V such that secondary batteries are not misjudged as being primary batteries also after they are charged nearly full. In this case, since secondary batteries do not surpass 1.45 V even after being charged nearly to its full capacity, they are not misjudged as being primary batteries.

Figure 3:
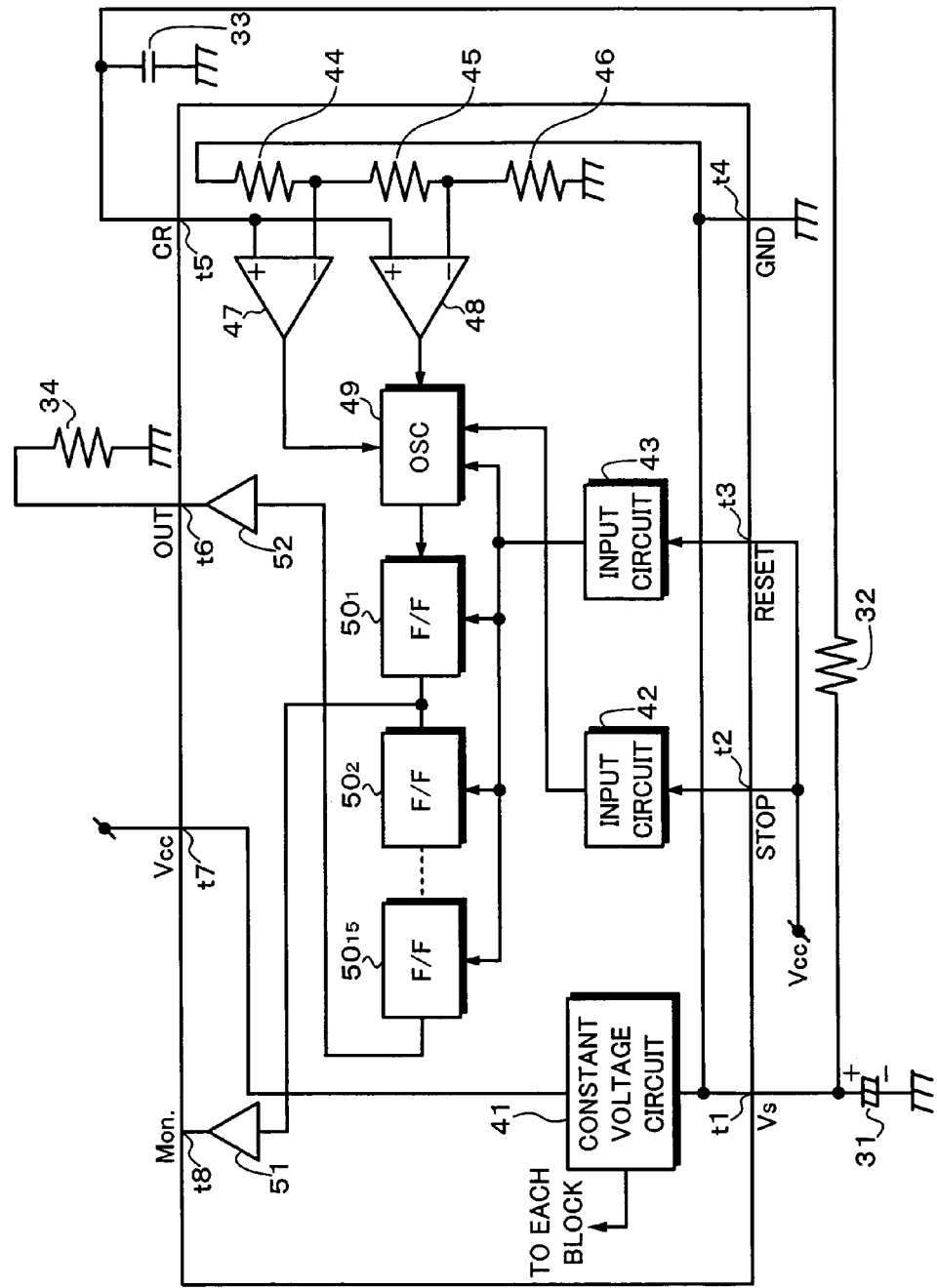
FIG. 3 is a block diagram for explaining a timer circuit usable in an embodiment of the invention.

With reference to FIG. 3, an example of the timer circuit 9 is explained. In this embodiment, a long-time timer IC:AN 6783S of Matsushita Electric Industrial Co., Ltd. is used as an example of the timer circuit 9. FIG. 3 shows an application circuit of AN6783S.

As shown in FIG. 3, the AN6783S is composed of eight pins. The first pin t1 is a Vs terminal for supplying a reference voltage. The second pin t2 is a Stop terminal for stopping oscillation of the AN6793S. The third pin t3 is a Reset terminal for resetting oscillation of the AN6783S. The fourth pin t4 is a GND terminal for connection to the ground potential.

The fifth pin t5 is a CR terminal for connection of a capacitor, resistor, and so forth. The sixth pin t6 is an Out terminal for outputting a signal. The seventh pin t7 is a Vcc terminal for supplying the source voltage. The eighth pin t8 is a Monitor terminal that is used to judge whether the AN6783S oscillates normally.

In this application circuit, connections of the respective terminals of the AN6783S are explained. The second pin t2, third pin t3 and seventh pin t7 are connected to the voltage Vcc in a so-called pull-up status. The fourth pin t4 is grounded, and the sixth pin t6 is grounded via a resistor 34. The first pin t1 is grounded via a capacitor 31, and the fifth pin t5 is grounded via a capacitor 33. A resistor 32 is interposed between the fifth pin t5 and the first pin t1.

The constant voltage circuit 41 is connected to the first pin t1 and the seventh pin t7. The constant voltage circuit 41 supplies a constant voltage to the respective blocks. Between the first pin t1 and the ground potential, resistors 44, 45 and 46 are connected in series. An input circuit 42 connected to the second pin t2 supplies a stop signal to the stop terminal of an oscillating circuit 49. An input circuit 43 connected to the third pin t3 supplies a reset signal to reset terminals of the oscillating circuit (oscillator: OSC) 49, flip-flop circuits $50_1$, $50_2$, ..., $50_{15}$.

Non-inverted input terminals of comparators 47 and 48 are connected to the fifth pin t5. The inverted input terminal of the comparator 47 is connected to the junction between the resistors 44 and 45. Output of the comparator 47 is supplied to the oscillating circuit 49. The inverted input terminal of the comparator 48 is connected to the junction between the resistors 45 and 46. Output of the comparator 48 is supplied to the oscillating circuit 49.

Output of the oscillating circuit 49 is supplied to the flip-flop circuit 50$_1$. Output of the flip-flop circuit 50$_1$ is supplied to the flip-flop circuit 50$_2$ and an amplifier 51. Output of the flip-flop circuit 50$_2$ is supplied to the flip-flop circuit 50$_3$. In this manner, outputs of the flip-flop circuits up to 50$_{15}$ are supplied in sequence. That is, a 15-stage flip-flip arrangement is formed.

Output of the flip-flop circuit 50$_{15}$ is supplied to the amplifier 52. Output of the amplifier 51 is output from the Monitor terminal of the eighth pin t8. Output of the amplifier 52 is output from the Out terminal of the sixth pin t6.

Figures 4A, 4B, 4C:
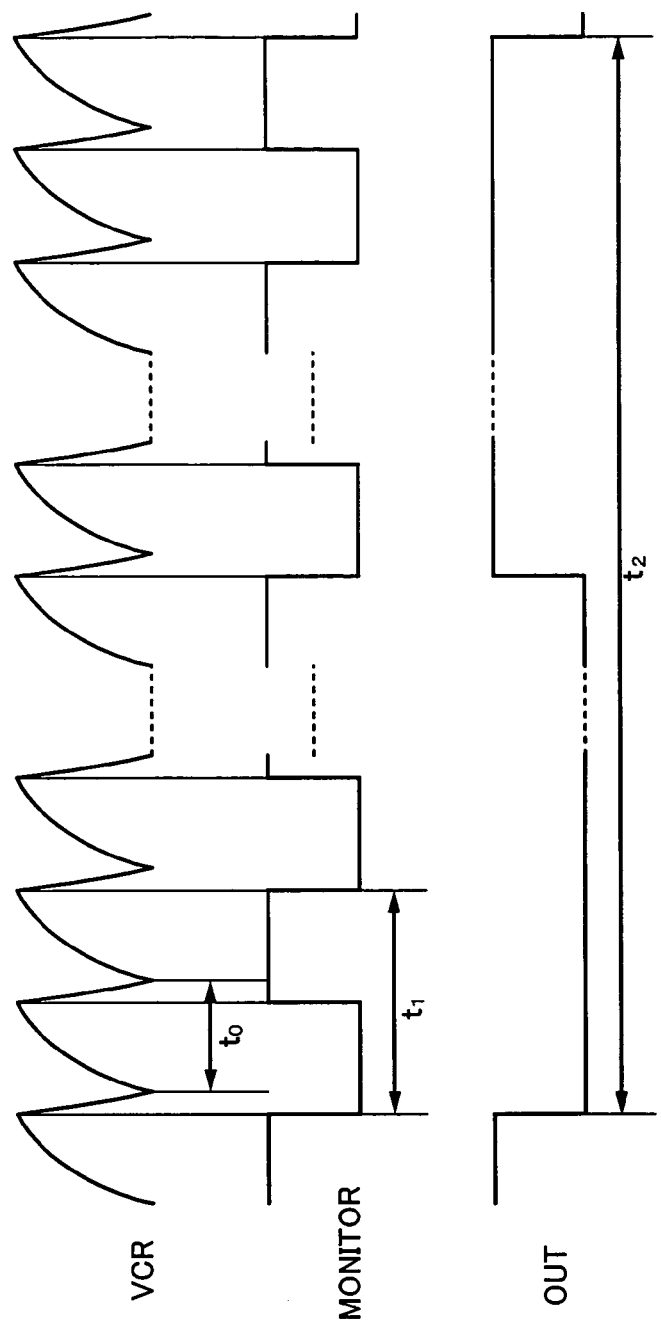
FIG. 4 is a timing chart for explaining a timer circuit usable in an embodiment of the invention.

Assume, for example, that a signal of the oscillation period to shown in FIG. 4A is supplied from the fifth pin t5. Then, the monitor signal obtained from the eighth pin t8 becomes the period of $t_1 = 2t_0$ as shown in FIG. 4B. In this case, the period of the output signal supplied from the sixth pin t6 to the switching circuit 2 becomes $t_2$ as shown in FIG. 4C. This output period $t_2$ becomes $$t_2 = 2^{15} x t_0$$
$$= 32768 t_0$$

Explained here are exemplary behaviors of the battery discriminating circuit 4 when the battery 3 is acknowledged as a secondary battery. When the battery 3 is acknowledged as a secondary battery, the switching circuit 5 turns off. Therefore, the time constant circuit connected to the timer circuit 9 is composed of the capacitor 6 and the resistor 7. When the switching circuit 5 turns off, a length of time of the timer is determined. The timer circuit 9 inverts the output when the predetermined length of time expires.

Although the method for setting varies with the specification of IC used, in case of using the AN6783S including 15-stage flip-flip circuits shown in FIG. 3, the oscillation period to (second) becomes $$t_0 = 0.947 R_1(\Omega) \cdot C_1(F)$$

and the output period $T_2$ (second) becomes $$t_2 = t_0 \times 32768$$
$$= 31.03 R_1 \; (k\Omega) \cdot C_1 (\mu F)$$

At that time, if the capacity of the capacitor 6 is 4 μF and the resistor 7 is 5 kΩ, then the timer time equals the length of time until the output of the timer circuit 9 inverts, namely, ½ of the output period $t_0$. Thus, it results in 4×5×31.03÷2=310.3 seconds=approximately 5 minutes and 10 seconds In case it is desired here to set the charging time for a secondary battery to 8 hours, if the capacity of the capacitor 6 is 4.7 μF and the resistor 7 is 390 kΩ, the timer time will become $$4.7 \times 390 \times 31.03 \div 2 = 28438.995 \text{ seconds}$$
$$= \text{approximately 53 minutes and 59 seconds}$$
$$= \text{approximately 8 hours}$$

In this fashion, at the point of time of expiration of the length of time set by the time constant circuit, output of the timer circuit 9 inverts, and the switching circuit 2 turns off. As a result of the OFF turn of the switching circuit 2, the charging of the battery 3 terminates. Since the current in the timer-type battery charger is determined to fully charge a battery in a predetermined length of time, at least the ability of fully charging secondary batteries is assured.

Next explained is an exemplary operation executed in the battery discriminating circuit 4 when the battery 3 is judged a primary battery. When the battery 3 is judged a primary battery, the switching circuit 5 turns on. Therefore, the time constant circuit connected to the timer circuit 9 is composed of the capacitor 6 and the combined resistance of the resistors 7 and 8. Once the switching circuit 5 turns on, the capacitor 6 and the combined resistance composed of the resistors 7 and 8 determine the timer time. The timer circuit 9 inverts its output upon expiration of the determined time.

In this manner, in case the switching circuit 5 is on, the resistors 7 and 8 make the combined resistance, and these resistors 7 and 8 are connected in parallel as shown in FIG. 1. Therefore, the resistance value of the time-constant circuit is smaller than that in the OFF state of the switching circuit 5. For example, assume that the timer time is set to 8 hours. If the resistor 7 is 390 kΩ and the resistor 8 is 1.5 kΩ, then the combined resistance of the resistors 7 and 8 is 390 kΩ×1.5 kΩ÷(390 kΩ+1.5 kΩ)=about 1.494 kΩ

The timer time becomes $$4.7 \times 1.494 \times 31.03 \div 2 = 108.943 \text{ seconds}$$
$$= \text{approximately 1.494 k}\Omega$$

Therefore, when the battery discriminating circuit 4 judges the battery a primary battery, the charging operation is executed for about 8 hours. When the battery is judged a primary battery, the charging operation terminates after about 1 minute and 49 seconds.

As such, since the battery discriminating circuit 4 can discriminate whether the battery is a primary battery or a secondary battery and can set a very short length of charging time when the battery is judged a primary battery, accidental liquid leakage caused by setting a primary battery by mistake can be prevented reliably.

It should be noted that the switching circuit 2 in the main circuit can be turned on and off directly without switching the time constant circuit of the timer circuit 9 by the switching signal of the battery discriminating circuit 4. In this case, after a primary battery is set in position, the switching circuit 2 first turns off, and the charging current does not flow for a while. Thereafter, however, once the battery voltage decreases lower than the reference voltage 22 due to self-discharge, or the like, of the primary battery, the battery discriminating circuit 4 misjudges that a secondary battery has been set, and may again turn on the switching circuit 2.

Once the switching circuit 2 turns on and the charging current flows, the battery voltage again rises. Therefore, the battery discriminating circuit 4 judges the battery as being a primary battery, and again turns off the switching circuit 4. Furthermore, self-discharge may cause a loop phenomenon repeating voltage drop and restart of charging. It is undesirable from the safety standpoint that charging is repeated while users are not aware.

In case of switching the time constant circuit, one the timer time matures, output of the timer circuit 9 does not invert even upon a change in output of the battery discriminating circuit 4, and it does not occur that the switching circuit 2 automatically turns on and again charges the battery. In general, once the battery is set in the battery charger, it is left there until the battery is actually used again. To cope with this problem, this embodiment switches the time constant circuit.

It should be noted that, in the instant embodiment, once a battery is set in position, the charging starts. Next explained is an example configured to detect that a battery is set in position. Before a battery is set in the dedicated battery charger for secondary batteries, the circuit is open. Once a battery is set in position, a circuit is formed because the battery has internal resistance. Thus, the charging may be started by detecting that the circuit has been formed. Alternatively, a sensor for detecting the loading of a battery may be provided.

Figure 5:
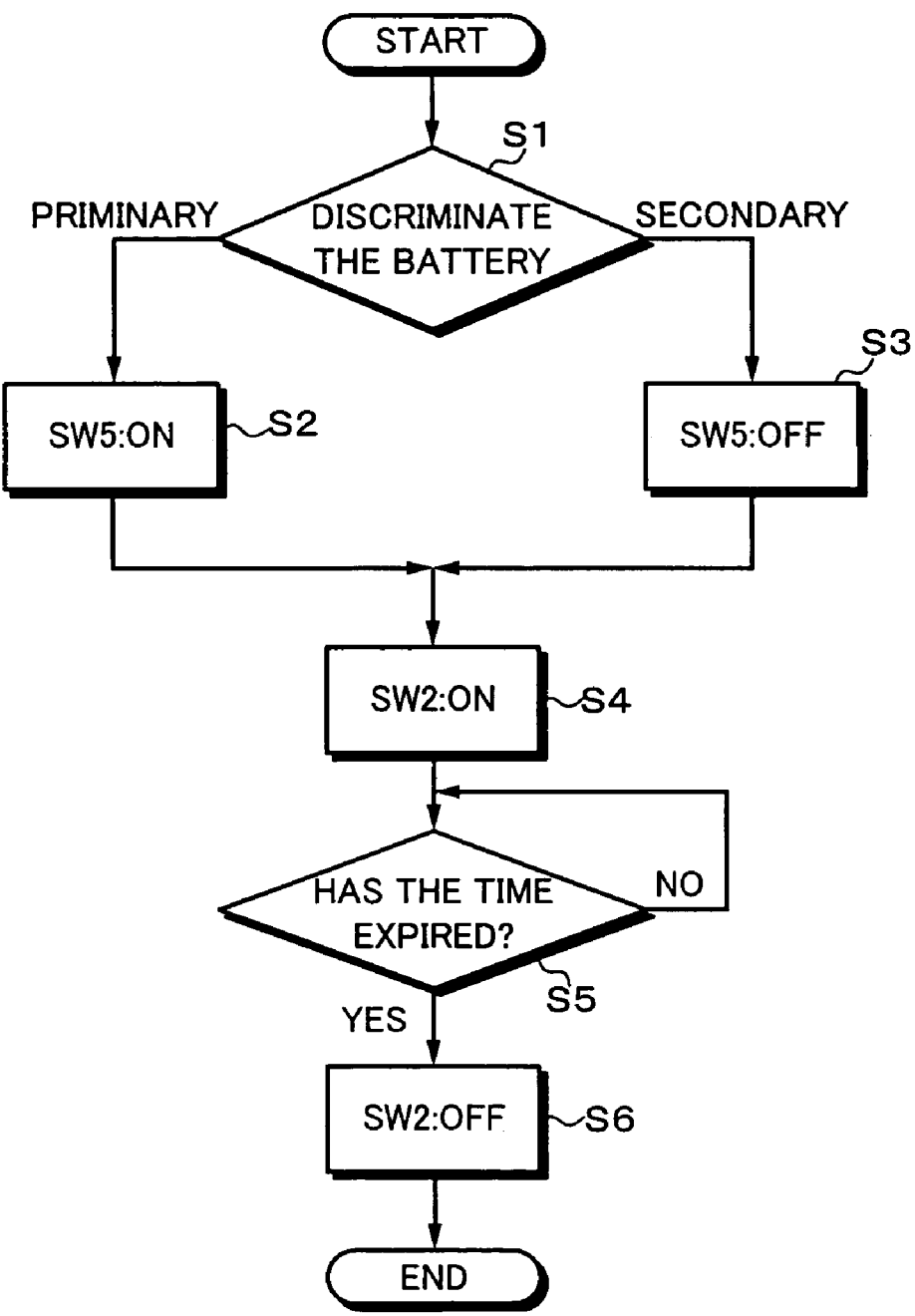
FIG. 5 is a flow chart for explaining an embodiment to which the present invention is applied.

With reference to the flow chart of FIG. 5, an embodiment of the invention is explained. In step S1, the battery discriminating circuit 4 judges whether the battery 3 set in position is a primary battery or a secondary battery. If the battery 3 is judged a primary battery, the control moves to step S2. If the battery 3 is judged a secondary battery, the control moves to step S3.

In step S2, the switching circuit 5 is turned on, and the charging time is set to approximately 1 minute and 49 seconds. In step S3, the switching circuit 5 is turned off, and the charging time is set to approximately 8 hours.

In step S4, the switching circuit 2 is turned on, and the charging is started. In step S5, it is judged whether the given time has expired or not. If the time is judged to have expired, the control moves to step S6. If it is judged that the given time has not expired yet, the control of step S5 is repeated. In step S6, the switching circuit 2 is turned off, and the charging terminates.

In this embodiment, the battery charger has been explained as charging for eight hours, for example, and setting a constant number. However, the embodiment is not limited to any battery chargers having a time constant circuit composed of a capacitor and resistors (combined resistance) and capable of setting any desired length of time.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A battery charger for controlling the length of time for charging a secondary battery with a timer circuit, comprising:
    discriminating means for discriminating whether a battery set in charging position is a primary battery or a secondary battery;
    a time constant means for setting the length of charging time by means of a time constant; and
    a timer having a time constant switching means for switching the time constant,
    wherein the time constant switching means switches the time constant to shorten the length of charging time, when the battery is judged a primary battery, to charge the primary battery.

2. The battery charger according to claim 1 wherein the discriminating means compares the terminal voltage of the battery with a reference voltage to acknowledge that the battery is a secondary battery when the terminal voltage is lower than the reference voltage and to acknowledge that the battery is a primary battery when the terminal voltage is equal to or higher than the reference voltage.

3. A charge control method for controlling the length of time for charging a secondary battery with a timer circuit, comprising:
    discriminating whether a battery set in charging position is a primary battery or a secondary battery;
    setting the length of charging time by means of a time constant; and
    switching the time constant to shorten the length of charging time, when the battery is judged a primary battery, to charge the primary battery.

4. The charge control method according to claim 3 wherein the discrimination of the battery is accomplished by comparing the terminal voltage of the battery with a reference voltage to acknowledge that the battery is a secondary battery when the terminal voltage is lower than the reference voltage and to acknowledge that the battery is a primary battery when the terminal voltage is equal to or higher than the reference voltage.

* * * * *